United States Patent [19]

Ogrodnick

[11] Patent Number: 5,755,549
[45] Date of Patent: May 26, 1998

[54] SELF LOADING AND UNLOADING CARGO DECK FOR PICK UP TRUCKS

[76] Inventor: Clarence Ogrodnick, 4031 Rundlehorn Drive N.E., Calgary, Alberta, Canada, T1Y 2K2

[21] Appl. No.: 628,804

[22] Filed: Apr. 5, 1996

[51] Int. Cl.[6] .................................................. G60P 1/64
[52] U.S. Cl. .................................................. 414/500
[58] Field of Search ........................ 414/50, 494, 506, 414/522, 538, 559

[56] References Cited

U.S. PATENT DOCUMENTS

| | | | |
|---|---|---|---|
| 838,715 | 12/1906 | Hughes | 414/522 |
| 1,730,480 | 10/1929 | Shirreff | 414/500 X |
| 1,885,399 | 11/1932 | Wren | 414/500 X |
| 2,021,952 | 11/1935 | Wren | 414/500 |
| 2,811,269 | 10/1957 | Anderson et al. | 414/500 |
| 3,049,378 | 8/1962 | Nelson | 414/500 X |
| 3,077,278 | 2/1963 | Alexander | 414/494 |
| 3,159,295 | 12/1964 | Love | 414/500 X |
| 3,221,913 | 12/1965 | Chamberlain | 414/500 |
| 4,645,406 | 2/1987 | Cooper et al. | 414/500 |
| 5,232,239 | 8/1993 | Livingston | 414/500 X |
| 5,511,929 | 4/1996 | Loftus | 414/538 X |
| 5,542,810 | 8/1996 | Florus | 414/538 |
| 5,556,249 | 9/1996 | Heine | 414/500 |

FOREIGN PATENT DOCUMENTS

| | | | |
|---|---|---|---|
| 909172 | 9/1972 | Canada | 414/494 |
| 1542045 | 3/1979 | United Kingdom | 414/500 |
| 9008052 | 7/1990 | WIPO | 414/500 |

*Primary Examiner*—David A. Gucci

[57] ABSTRACT

The present invention comprises a support frame secured within the cargo box of a pick up truck. The frame supports a drive train comprising a differential driven by an motor. One differential shaft drives a first cable winch while the other shaft incorporates a clutch to drive a second and third winch either independantly from each other or in unison. A system of pulleys ensures that cable wind on the first and second winches is toward the front of the cargo box while on the third winch it is toward the rear. The cable ends are secured to a cargo platform. When the electric motor is engaged the first and second winches are rotated, in a counterclockwise direction which winds the cable into the winch body. The retracting cable first raises and then draws the platform onto the frame. During this process the third winch freewheels and releases cable as necessary. Unloading the platform requires that the clutch mechanism is engaged to couple the second and third winches together. The motor is reversed and the first, second, and third winches rotate in a clockwise direction. The third winch retracts cable while the first and second winches release cable. The retracting cable, draws the platform off the support frame and toward the rear of the cargo box. As the platform draws far enough rearward to tilt off the support frame, the clutch is disengaged and the third winch freewheels, leaving the platform to continue to lower under its own weight.

1 Claim, 5 Drawing Sheets

SELF LOADING AND UNLOADING CARGO DECK FOR PICK UP TRUCKS

FIELD OF THE INVENTION

This invention relates to the field of cargo carrying devices and systems for use in pick up trucks; specifically to a self loading and unloading cargo deck for such trucks.

BACKGROUND DESCRIPTION OF KNOWN ART

The utility of pick up trucks is well understood and appreciated by those who drive them. However, those who have used such trucks to carry bulky and heavy objects know well the problems associated with such activity. For example snowmobile enthusiasts often need to transport their sports vehicles to relatively remote locations where the use of such vehicles may be enjoyed without disturbing others.

The sheer size and bulk of snowmobiles, renders their transportation via pick up trucks especially problematic. They are difficult to load and unload, especially in remote areas where help may not be readily available, and the restrictive configuration of a typical pick up truck cargo box can make transporting more than one vehicle impossible.

It is not unusual to find a large variety of makeshift devices used to expand the cargo carrying capacity of pick ups; the most common being that of a rigid platform laid over the truck's cargo box sidewalls and held in place by whatever means available. Such platforms do, of course, permit more than one snowmobile to be carried but simply exacerbate the problem of loading and unloading those snowmobiles.

Not surprisingly, inventors have developed several solutions to this problem ranging from simple ramps to complex side loading mechanisms whereby the cargo platform swings out over the side of the vehicle and is lowered to the ground.

While certainly better than manhandling the machines off the cargo platform all such devices heretobefore known suffer from one or more shortcoming. For example the danger associated with the use of ramps is obvious; they must be carefully positioned and the tendency for the ramp to move while in use must be accommodated. Those mechanisms which attempt to automate the loading and unloading procedure generally employ linkages whereby the cargo platform becomes unsupported at one end and therefore must be overbuilt to withstand the cargo weight. In addition, some automated systems employ mechanisms which occupy the truck's cargo box almost to capacity thus leaving little room for cargo storage underneath the cargo platform.

The present invention seeks to remedy many of the inherent difficulties associated with current loading/unloading methods and devices by providing a relatively simple, yet safe and reliable, alternative system.

An embodiment of the present invention comprises a rigid support frame which fits inside the cargo box of a pick up truck. The frame is generally confined to the perimeter of the box, leaving the interior of the box free for storage of additional cargo. Two of the individual elements which comprise the frame overhang the cargo box sidewalls and serve as anchor points for tie down cables as well as convenient locations for marker lights.

The frame supports a drive train assembly which comprises a differential unit driven indirectly via a pulley system by a direct current electric motor. One differential output shaft is directly coupled to a first wire cable winch for rotation thereof while the other differential output shaft is directly coupled to a second wire cable winch having first passed through a third cable winch with the third winch free to rotate about the differential output shaft. A conventional clutch mechanism interposed between the second and the third cable winch couples and decouples the second and third winch so that, when required the third winch may be directly driven in unison with the second winch.

Cable from the first and second winches is routed via a pulley system such that as the cable is wound onto the winch cable movement is toward the front of the truck cargo box. Cable from the third winch is routed such that as the cable is wound onto the winch, cable movement will be in a direction toward the rear of the truck cargo box.

The cable ends are secured to one end of a flat cargo platform. The other end of the platform incorporates a pair of freewheeling wheels which enable free movement of the platform along the ground. In operation, snowmobiles are loaded onto the cargo platform and secured thereon by conventional means. The electric motor is engaged such that the first and second winches are rotated via the differential in a counterclockwise direction which winds the cable into the winch body. The retracting cable first raises and then draws the platform onto a pair of guide pulleys located on the support frame and subsequently fully onto the frame. During this process the third winch is freewheeling and releasing cable as necessary.

Unloading the platform requires that the clutch mechanism is engaged to couple the second and third winches together. The direction of rotation of the electric motor is reversed and the first, second, and third winches rotate in a clockwise direction. The third winch now begins to retract cable while the first and second winches release cable. As the third winch retracts cable, the platform is drawn off the support frame and toward the rear of the truck cargo box. As the platform draws far enough rearward to tilt off the support frame, the clutch is disengaged and the third winch again freewheels leaving the platform to continue to lower under its own weight controlled by the rate at which the cable is released from the first and second winches.

OBJECTS AND ADVANTAGES

From the foregoing it may be seen that the present invention is relatively simple in operation, yet offers several advantages not found in the known art. The support frame leaves the truck cargo box relatively free for additional storage. Loading and unloading the cargo platform is completely automatic and effortless from an operators standpoint.

Other objects and advantages will become apparent upon consideration of the ensuing description and accompanying drawings.

SUMMARY

According to one aspect the present invention is an apparatus for raising a cargo deck from ground level to a position above ground level and for then returning the cargo deck to ground level.

DRAWING FIGURES

The present invention as exemplified by a presently preferred embodiment is described hereinafter in greater detail having reference to the accompanying drawings wherein.

DESCRIPTION OF THE PRESENT EMBODIMENT

Figure 1:
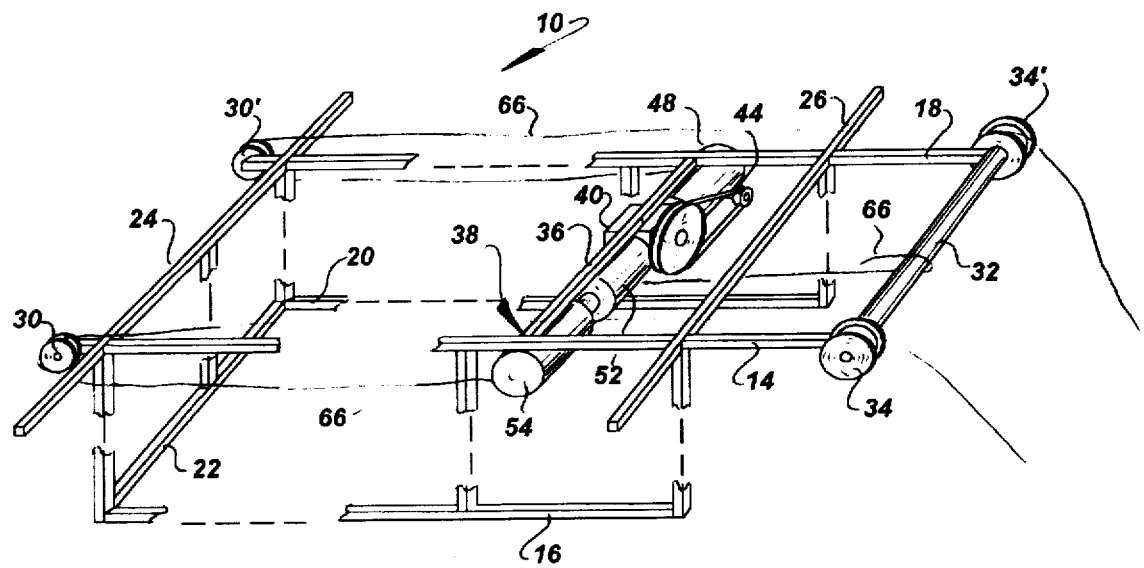
FIG. 1 is a pictorial view of the main support frame showing the relative placement of components.

When used in the following description "distal end" or "distal" refers to that portion of a component nearest the cab area of a pick up truck. When used in the following description "proximate end" or "proximate" refers to that portion of a component nearest the tailgate area of a pick up truck. When used in the following description the terms "left" and "right" refer respectively to the driver's side and passenger's side of a pick up truck. When used in the following description the terms "bottom" and "top" refer respectively to a direction toward the floor of the cargo bay of a pickup truck and a direction away from the floor of the cargo bay.

The present invention is comprised of a rigid and robust support frame generally designated by the numeral 10 in the drawings. The frame 10 includes a left top side rail 14, a left bottom side rail 16 and a plurality of bracing elements therebetween;and, a right top side rail 18, a right bottom side rail 20, and a plurality of bracing elements therebetween. A bottom transverse element 22 and a first top transverse element 24 with a plurality of bracing elements therebetween connect the respective side rails at the distal end of the rails. A second top transverse element 26 connects the side rails at the proximate end. The support frame 10 thus has a generally rectangular shape and is dimensioned to fit within the confines of a pickup truck 12 cargo bay such that the top rails of the frame 10 are slightly above, the top edge of the pickup truck 12 cargo bay side walls. The first transverse top rail 24 and the second transverse top rail 26 are substantially equal in length to each other and greater in length than the width of the frame 10 so that the first transverse top rail 24 and the second transverse top rail 26 overhang either side of the pickup truck 12 cargo bay side walls to provide means whereby the frame 10 may be firmly secured and levelled within the confines of the truck 12 cargo bay by attachment of suitable and conventional tie downs 28 between each of the ends of the first 24 and second 26 transverse elements and appropriate mounting points on the truck 12 body. Each of the ends of the first transverse element 24 and the second transverse element 26 additionally may serve as a mounting surface for conventional marker lights (not shown). A pair of conventional pulleys 30 and 30' are rotatably and vertically mounted to each of the distal ends of the left and right top side rails 14, 18. A pulley bar 32 having a circular cross section and having a pair of rotatable guide pulleys 34 and 34' axially mounted to either end thereof is transversely mounted between the left top 14 and right top 18 side rails, proximate to the second top transverse element 26. A third top transverse element 36 is mounted between the left and right top side rails 16,18 intermediate the first top transverse element 24 and the second top transverse element 26 and functions as a mounting platform to accommodate placement of the drive assembly, generally designated by the numeral 38 in the drawings.

Figure 2:
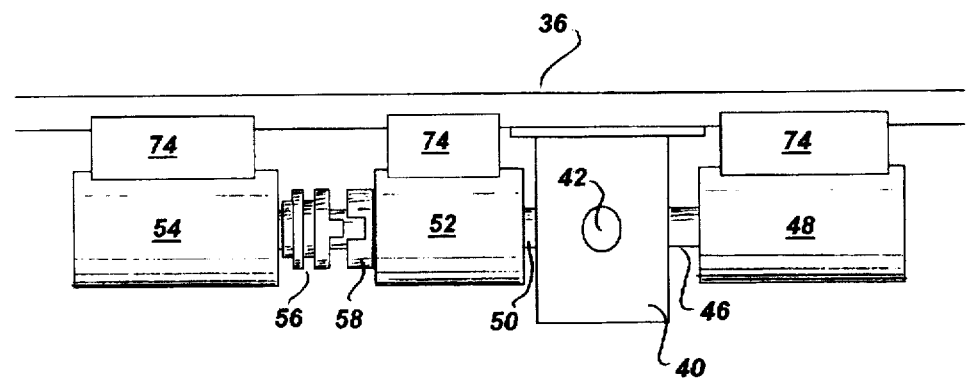
FIG. 2 is a schematic view of the drive train of the present embodiment.
Figure 2A:
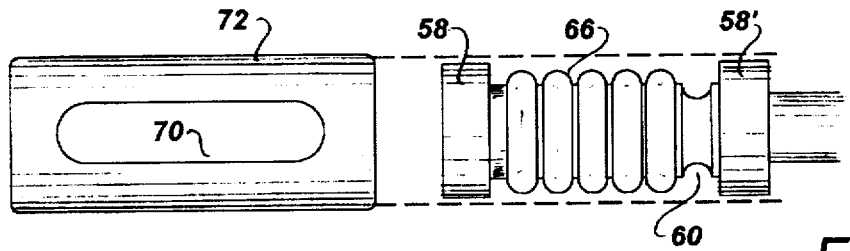
FIG. 2A is a schematic of the cable winch of the present embodiment.
Figure 2B:
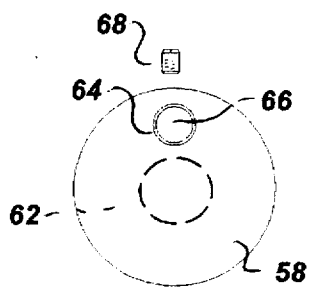
FIG. 2B is a schematic of the cable winch of FIG. 2A showing the means for locating a cable end within the winch.

Referring now to FIGS. 2 to 2B it will be seen that the drive assembly 38 comprises a conventional differential drive unit 40 mounted to the underside of the third top transverse element 36 by any conventional and appropriate fastening means. The input shaft 42 of the differential 40 faces toward the proximate end of the support frame 10 and may be driven in one direction by pulley means 44, which pulley means 44 is, in turn, driven by a reversible direct current electric motor (not shown). Reversing rotation of the motor (not shown) output drives the input shaft 42 of the differential 40 in the opposite direction.

One output shaft 46 of the differential is axially coupled to, and drives a right pull-on cable winch, rotating the winch 48 in unison with the output shaft 46. The other output shaft 50 of the differential 40 passes through an axial bore in a pull-off cable winch 52 and is free to rotate therein. After passing through the pull-off winch 52 the output shaft 50 of the differential 40 is axially coupled to, and drives a left pull-on cable winch 54 rotating the winch 54 in unison with the output shaft 50. A conventional clutch mechanism of the type having a first moveable element 56 splined to the differential 40 output shaft 50 and slidably engageable with a second element 58 fixed to the end of the pull-off winch 52 is interposed between the pull-off winch 52 and the left pull-on winch 54 so that movement of the splined element 56 into engagement with the fixed element 58 couples the pull-on winch 54 to the pull-off winch 52, rotating both winches 52, 54 in unison. The clutch elements 56, 58 may be alternately engaged and disengaged by any conventional and appropriate means such as electric solenoid activation and/or mechanical linkages.

The pull-on and pull-off cable winches 48, 54, 52 are comprised of a pair of circular end elements 58 and 58' with a spool element 60 integrally mounted therebetween, the assembly having an axial bore 62 therethrough for receipt of the differential 40 output shafts 46, 50. One end element 58 further incorporates a second bore 64 therethrough to receive one end of a wire cable 66 therein; the cable 66 end secured in the bore 64 by any conventional and appropriate means such as a grub screw insertion 68. With one end of the wire cable 66 secured in the end element 58 bore 64, the cable 66 is wrapped on the spool 60 and the other end of the cable 66 passed through an elongate opening 70 in a cylindrical shield 72, which shield 72 is then inserted over the end elements 58, 58' and spool 60, and attached by any conventional and appropriate means such as welded bracketing 74 to the third top transverse element 36 of the support frame 10.

Figure 3:
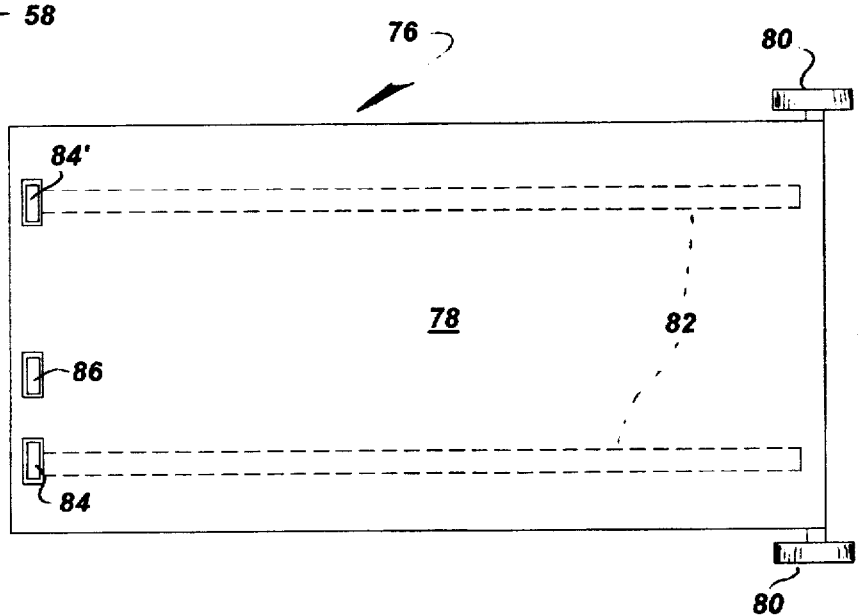
FIG. 3 is a plan view of the cargo platform of the present embodiment.
Figure 3A:
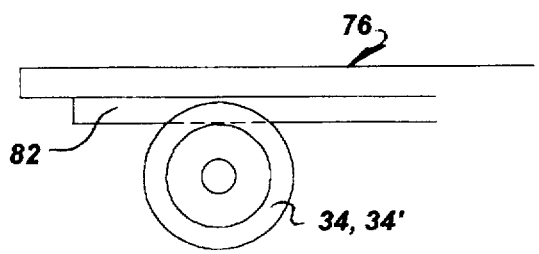
FIG. 3A is a schematic partial view of the platform of FIG. 3 showing the operation of the platform guide rails.
Figure 4:
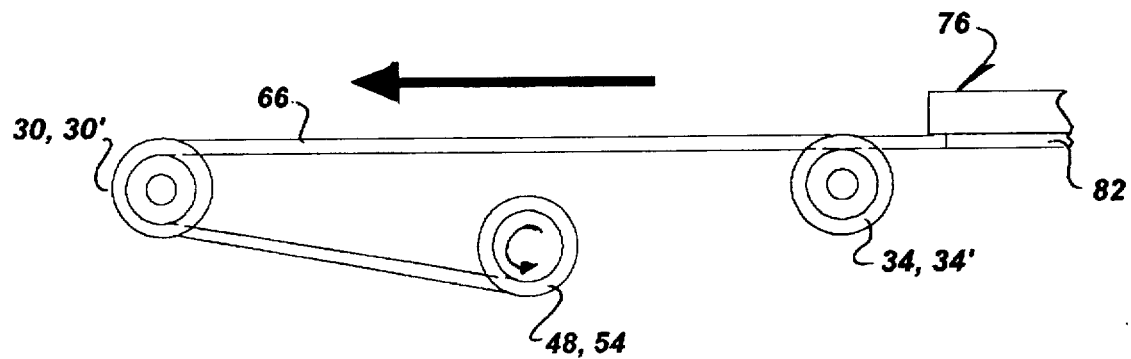
FIG. 4 is a schematic representation of the action of a pull-on winch in directing movement of the platform onto the support frame.
Figure 4A:
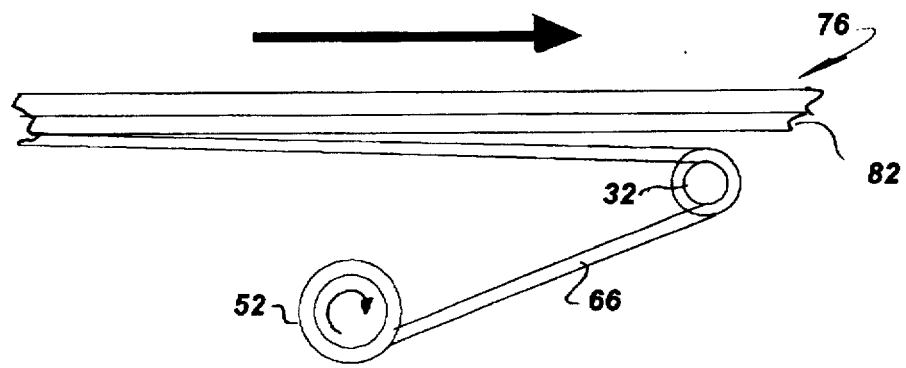
FIG. 4A is a schematic representation of the action of the pull-off winch in directing movement of the platform off the support frame.
Figure 5:
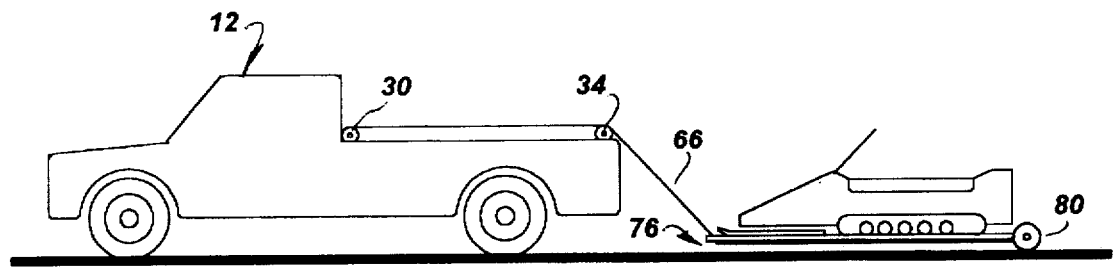
FIG. 5 is a pictorial side view of the present embodiment prior to loading of the platform onto the support frame.
Figure 5A:
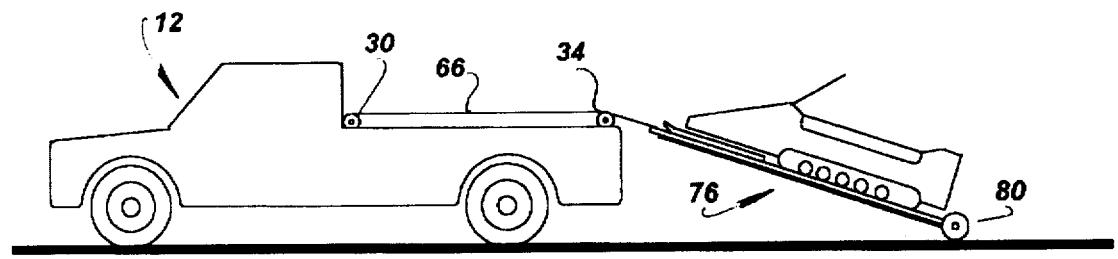
FIG. 5A is pictorial side view of the present embodiment as the platform is drawn onto the support frame.
Figure 5B:
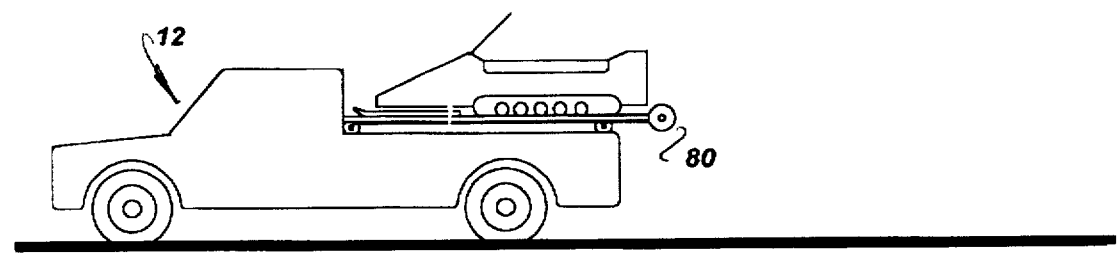
FIG. 5B is a pictorial side view of the present embodiment with the platform fully docked on the support frame.
Figure 6:
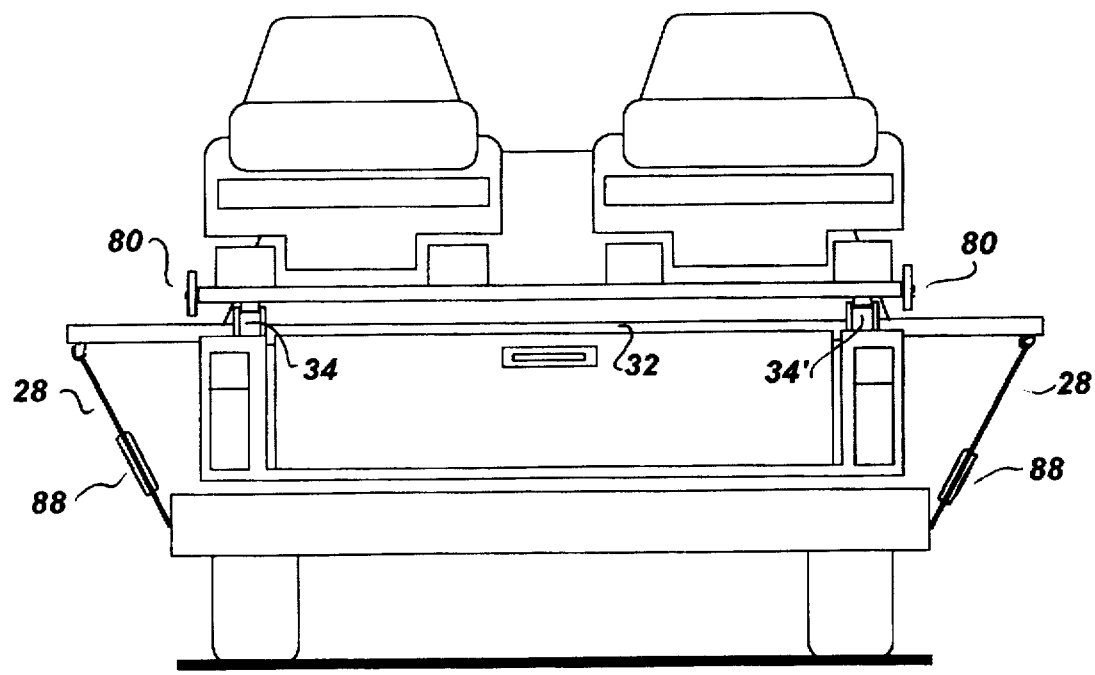
FIG. 6 is a pictorial rear view of a pick up truck with the cargo platform and cargo fully docked on the support frame.
Figure 6A:
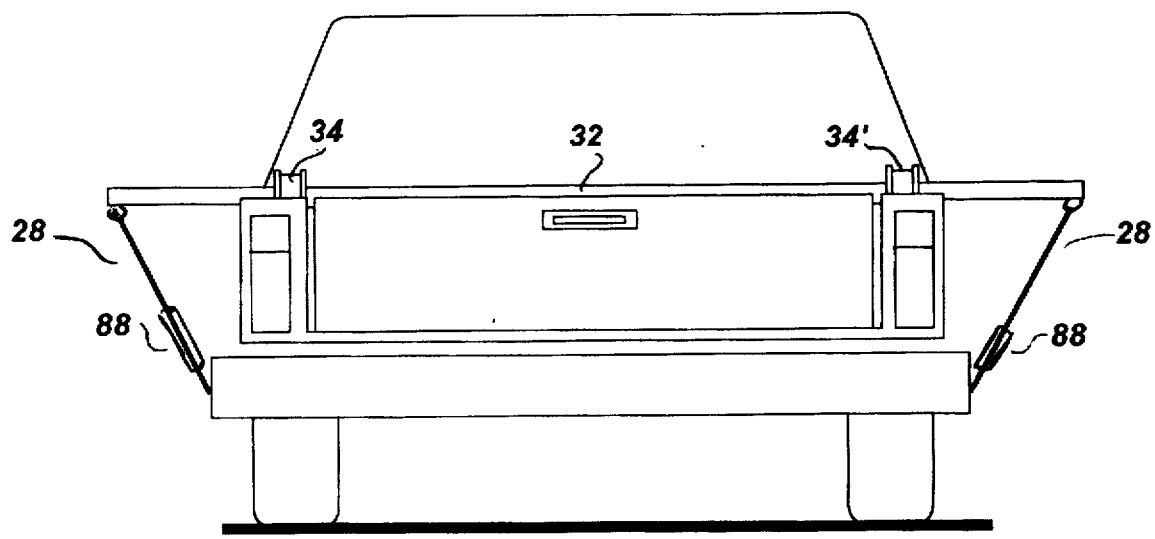
FIG. 6A is the same view as FIG. 6 with the cargo platform removed.

Referring now to FIGS. 3 and 3A it will be seen that the present invention further includes a cargo deck, designated in the drawings as number 76, which deck 76 is comprised of a generally rectangular rigid platform 78 of dimensions approximating those of a pick up truck 12 cargo bay, and having a pair of opposing ground contacting freewheeling wheels 80 at the proximate end thereof. The deck 76 further includes, on its bottom surface, a pair of spaced apart and parallel, longitudinally mounted guide rails 82 and 82' of rectangular cross section and of a width and depth sufficient to form a clearance fit to the support frame 10 guide pulleys 34 and 34' such that the guide rails 82 and 82' ride within the corresponding guide pulley 34 and 34' as the deck 76 is loaded onto the support frame 10. The deck 76 further includes a pair of cable mounting points 84', 84, to accommodate conventional mounting of the ends of the wire cable 66 from the left and right pull-on winches 48,54 and a third mounting point 86 to accommodate conventional mounting of the cable 66 end from the pull-off winch 52.

Operation of the present invention will best be understood with reference to FIGS. 1 and 4 to 6A wherein it will be seen that the support frame 10 of the present invention is first positioned within the cargo bay of a pick up truck 12, and secured and levelled therein by the attachment and adjustment of the tie down cables or chains 28 to appropriate positions on the truck 12 body. While the tension applied to the tie downs 28 may be accomplished by any conventional and suitable means, the present embodiment utilizes conventional turnbuckles 88 in series with the tie downs 28. The deck 76 is positioned on the ground behind the pickup truck 12 with the wheels 80 of the deck 76 facing away from the rear of the truck 12. The wire cable 66 from the left pull-on winch 54 is threaded underneath the first top transverse element 24, over the left distal pulley 30, over the top surface of the left guide pulley 34 and secured by conventional means such as a "U" clamp to the left mounting point 84 of the deck 76. The wire cable 66 from the right pull-on winch 48 is threaded underneath the first top transverse element 24, over the right distal pulley 30', over the top surface of the right guide pulley 34' and secured by conventional means such as a "U" clamp to the right mounting point 84' of the deck 76. The wire cable 66 from the pull-off winch 52 is threaded underneath the guide pulley bar 32 and attached by conventional means such as a "U" clamp to the mounting point 86 of the deck 76.

Electrical power is applied to the DC motor (not shown) such that the output shafts 46, 50 of the differential 40 rotate in a counterclockwise direction thus causing both pull-on winches to rotate in the same direction winding the wire cable 66 back onto their respective spools 60 and, as a consequence raising the distal end of the deck 76 off the ground and toward the support frame 10 guide pulleys 34, 34'. As the deck 76 is raised to the height of the guide pulleys 34, 34' the bottom guide rails 82 of the deck 76 contact the guide pulleys 34, 34' and the deck begins to settle on the left top side rail 16 and right top side rail 18 of the support frame 10. With continued movement of the deck 76 toward the front of the pick up truck 12, cable 66 begins to unwind from the freewheeling pull-off winch 52 and is looped over the guide pulley bar 32. Electrical power to the motor (not shown) is removed when the deck 76 has been drawn all the way to the front of the truck 12 cargo bay.

The splined clutch element 56 is engaged with the fixed clutch element 58 thus coupling the left pull-on winch 54 to the pull-off winch 52. Power to the motor (not shown) is reversed causing the output shafts 46, 50 of the differential 40 to rotate in a clockwise direction. The pull-off winch 52 begins to wind the wire cable 66 onto the winch 52 spool 60 over the guide pulley bar 32, which bar 32 acts as a pulley wheel, drawing the deck 76 away from the front of the truck 12 cargo bay. Concurrently, cable 66 unwinds from the left and right pull-on winches 54,48. As the deck 76 begins to tilt off the support frame 10 the splined clutch element 56 is disengaged from the fixed clutch element 58 permitting the pull-off winch 52 to freewheel and allowing the full weight of the deck 76 to become supported by the cable 66 from the left and right pull-on winches 54, 48, which winches 54, 48 continue to unwind cable 66 thus gently lowering the deck 76 to the ground. It will be understood that as the distal end of the deck 76 is raised or lowered the deck rolls forward or backward on the deck 76 ground contacting wheels 80.

While the above description contains many specificities, these should not be construed as limiting the scope of the invention but rather as an illustration of a present embodiment. It is apparent that the present embodiment admits of several variations and modifications without in any fashion detracting from the spirit of the invention. Thus the scope of the invention should be determined by the appended claims and their legal equivalents.

I claim:

1. An apparatus for raising a cargo deck from ground level to a position above ground level and for then returning the cargo deck to ground level comprising:

a cargo deck;

at least one ground contacting freewheeling wheel attached to one end of the cargo deck to permit forward and rearward movement of the cargo deck;

support frame means onto which the cargo deck will be positioned when raised above ground level;

at least one pull-on cable winch and cable and one pull-off cable winch and cable mounted to the support frame means;

means for connecting the cables from the winches to the other end of the cargo deck;

means for routing the cable from each winch to the cargo deck so that as each winch winds and unwinds, their respective cables are moving in opposite directions;

means for rotatably driving the winches independently of each other so that rotation of the pull-on winch in one direction draws the deck upward and onto the support frame means while the pull-off winch freewheels and releases cable;

means for coupling the winches together so that as the pull-off winch draws the cargo deck of the support frame means the pull-on winch releases cable at a rate consistent with a speed at which the cargo deck is withdrawal from the support frame means; and means for decoupling the winches so that as the cargo deck tilts off the support frame means cable release from the pull-on winch supports the deck weight while the pull-off winch freewheels.

* * * * *